May 22, 1956        K. W. HAGANS        2,746,258

REFRIGERANT CHARGING AND WEIGHING DEVICE

Filed Nov. 23, 1953        2 Sheets-Sheet 1

INVENTOR.
Kenneth W. Hagans
BY
Frease & Bishop
ATTORNEYS

May 22, 1956 K. W. HAGANS 2,746,258
REFRIGERANT CHARGING AND WEIGHING DEVICE
Filed Nov. 23, 1953 2 Sheets-Sheet 2

INVENTOR.
Kenneth W. Hagans
BY
Frease & Bishop
ATTORNEYS

United States Patent Office 2,746,258
Patented May 22, 1956

2,746,258

REFRIGERANT CHARGING AND WEIGHING DEVICE

Kenneth W. Hagans, Alliance, Ohio

Application November 23, 1953, Serial No. 393,548

10 Claims. (Cl. 62—1)

The invention relates to a device for charging refrigerant fluid into the unit of a refrigerator or similar apparatus and more particularly to such a device in which the refrigerant charge is accurately weighed.

It frequently happens that refrigerators, freezers and the like must be serviced owing to breakdown of the unit or a leak permitting escape of the refrigerant fluid therein. This may require the replacing of the unit or merely repairing the leak, but in either case it is necessary that an accurate amount of refrigerant fluid be charged into the unit after the repairs are made.

No adequate device has heretofore been obtainable for accurately measuring the amount of refrigerant fluid charged into a refrigerator or the like under such conditions.

It is therefore an object of the invention to provide a refrigerant fluid charging device having means for accurately weighing the amount of the charge.

Another object is to provide such a device having a scale provided with a platform upon which a bottle or drum containing refrigerant fluid is mounted, a charging valve being provided in the device and adapted to be connected to said bottle and to the unit of the refrigerator by flexible hose.

A further object is to provide a device of this character in which the charging valve is mounted upon a stationary support and the flexible hose connecting the charging valve to the bottle is supported so as not to cause any fluctuation in the scale due to the weight of the hose or valve.

A still further object is to provide a refrigerant fluid charging device of the character referred to in which means is mounted upon the platform of the scale for supporting a gas bottle in upright position thereon.

Another object is to provide such a device in which the bottle supporting means comprises a bracket having means for supporting the lower end of the bottle, and an upright arm provided with a horizontal ring adapted to surround the bottle and hold it in vertical position.

A further object is to provide a fluid charging device of the character referred to comprising a case or box having a scale therein, a hinged cover adapted to be opened to provide access to the platform of the scale so as to mount a bottle thereon, and a hinged front wall upon which the charging valve is rigidly mounted, said front wall being adapted to be opened to horizontal position so as to rest upon a floor or other horizontal supporting surface to permit operation of the charging valve without disturbing the scale.

The above objects together with others which will be apparent from the drawings and following description, or which may be later referred to, may be attained by constructing the improved fluid charging device in the manner hereinafter described in detail and illustrated in the accompanying drawings, in which.

Figure 1:
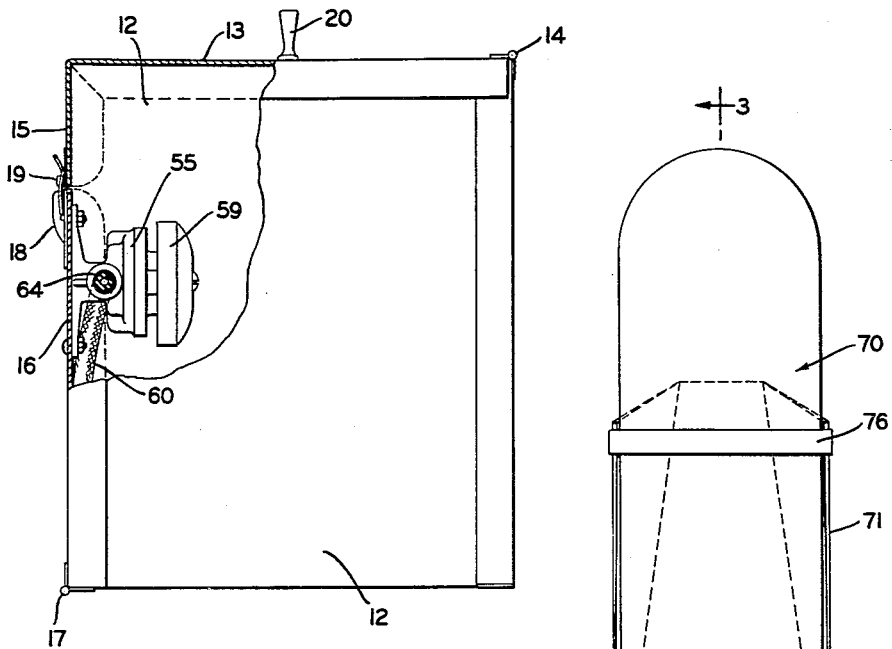
Fig. 1 is a side elevation of the device with the cover and hinged front wall in closed position, parts being broken in section for the purpose of illustration.

In general terms, the invention may comprise a box or case formed of heavy sheet metal or other suitable material, having a scale mounted therein and provided with a vertically movable platform, a hinged cover upon the top of the box adapted to be swung back to open position to permit access to the platform of the scale, a detachable supporting bracket for attachment to the platform for supporting a bottle in vertical position, and a hinged front wall adapted to be opened to horizontal position and having a charging valve rigidly mounted thereon, rubber hose being attached to opposite sides of the valve for connection to the outlet of the bottle and to the inlet of the unit of a refrigerator or similar apparatus.

Referring now more particularly to the embodiment of the invention illustrated herein, in which similar numerals refer to like parts throughout, the improved liquid charging device comprises a box of metal or other suitable material comprising a bottom wall 10, back wall 11 and side walls 12 rigidly connected together at their adjoining edges.

A top wall 13 is hingedly connected at its rear edge to the upper edge of the back wall 12, as indicated at 14, and may be provided with the angular flange 15 at its forward edge adapted to enclose the upper portion of the front of the box, and extend downward to the upper edge of the hinged front wall 16 which is hingedly connected at its lower edge to the forward edge of the bottom wall 10, as indicated at 17.

Any suitable cooperating latch members 18 and 19 may be mounted upon the adjacent edge portion of the hinged front wall 16 and the angular flange 15 of the cover respectively, to hold said parts in closed position, as shown in Fig. 1, when the device is not in use, and a handle 20 may be attached to the cover 13 for carrying the device when in closed position.

Figure 3:
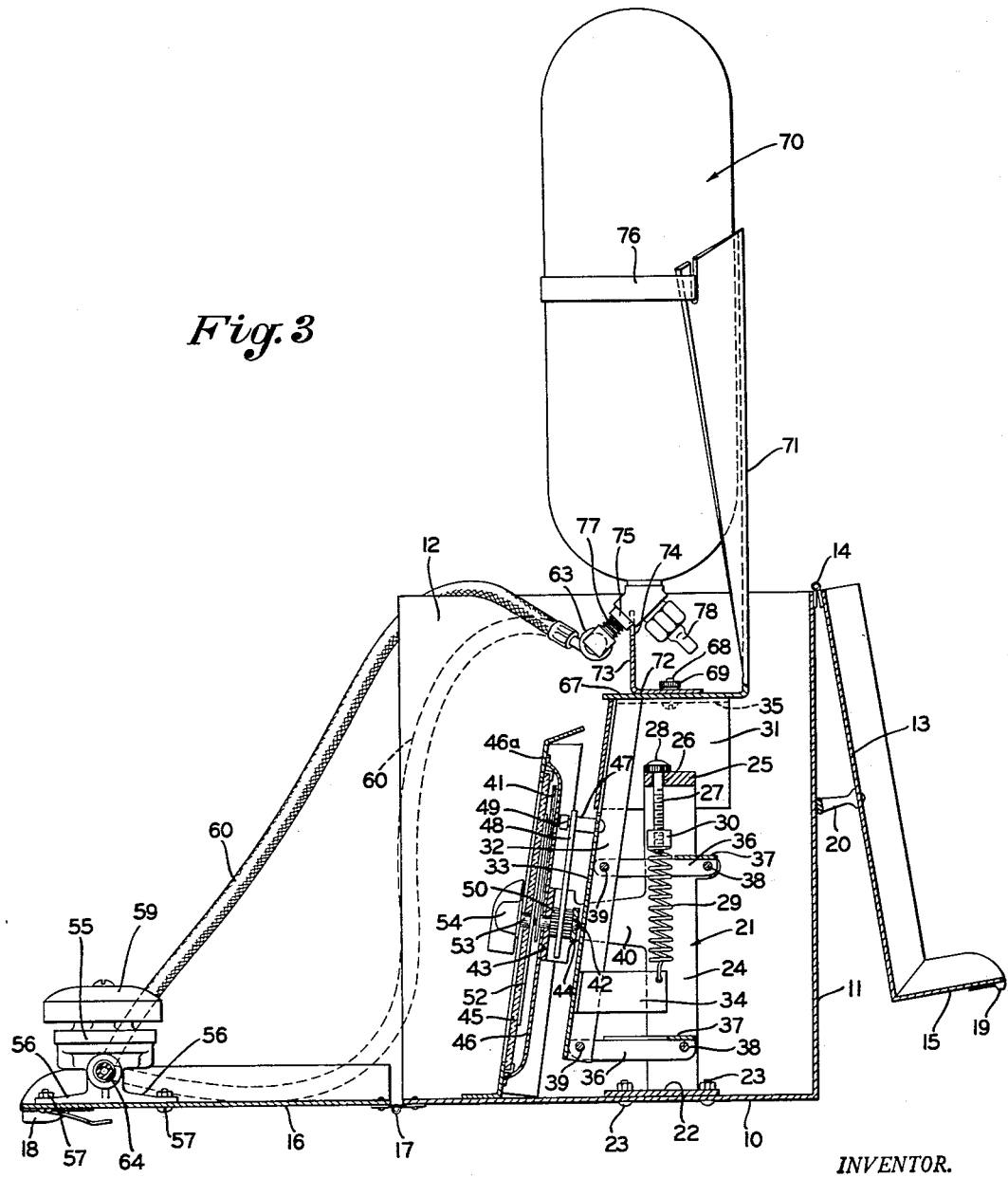
Fig. 3 is a transverse section through the device, taken on the line 3—3, Fig. 2.

A scale is located within the box so as to be entirely enclosed therein when the hinged front wall and cover are swung to closed position. As best shown in Fig. 3, this scale may be supported upon the bottom wall 10 of the case or box.

For this purpose a sub-frame, indicated generally at 21, is provided and may be an integral structure having a base 22 attached to the bottom wall 10 of the box or casing, as by bolts 23, and having the spaced uprights 24 extending upwardly from opposite sides thereof and connected together at their upper ends by the horizontal bridge portion 25.

The horizontal bridge 25 is shown as having an aperture 26 extending therethrough, through which is located a threaded spring supporting member 27. A head 28 is formed upon the top of the threaded member 27 and a coil tension spring 29 is connected to the lower end thereof through the adjusting nut 30 by means of which the position of the tension spring 29 may be vertically adjusted to calibrate the scale.

The scale platform has a frame structure 31 to opposite sides of which are secured parallel spaced, downwardly extending legs 32 shown herein as being formed integrally with and extending upwardly from a plate 33. A lug 34 is connected to the lower portion of the plate and extends inwardly therefrom, the lower end of the tension spring 29 being connected to said lug. The upper end of the frame structure 31 is provided at opposite sides with outwardly disposed horizontal flanges 35 for a purpose to be later described.

The platform frame structure is connected to the sub-frame 21 means of two spaced parallel pairs of links 36 so as to support the platform structure to move vertically in a plurality of parallel planes. The links 36 are shown as formed from plates 37 having opposite sides thereof bent at right angles with respect thereto to form said links, and being cut away adjacent the plate 34 to provide clearance therefor.

The links 36 are pivotally connected at one end to the upright legs 24 of the sub-frame, as by the pivotal pins 38 and the opposite ends thereof are pivotally connected to the depending legs 32 of the platform frame structure by the pivotal pins 39.

The sub-frame 21 also has a horizontally disposed yoke 40 extending forwardly from the legs 24 thereof, intermediate the ends of said legs and herein shown as being of a substantially U-shaped form and as having the pointed 41 pivotally supported thereon on a shaft 42 journalled in an apertured portion 43 therein, and an apertured plate 44 connected at opposite ends to the yoke structure 40.

The outer face of the yoke structure 40 may be inclined at the angle of the dial crystal 45 and has a backing plate 46 for the pointer 41, secured thereto in any usual and well known manner. The backing plate is shown herein as being of a saucer-like formation attached to the inclined front plate 46a with the dial crystal 45 mounted in the outer rim thereof and enclosing said backing plate and pointer.

A boss 47 extends outwardly from the plate 33 and the upper end of a rack bar 48 is connected thereto as by the screw 49, the rack bar depending therefrom and having teeth (not shown) formed on the inner edge thereof which mesh with the teeth of a pinion 50 on the pointer shaft 42, as is well known to those skilled in the art, for pivoting said pointer shaft and the pointer 41 upon vertical movement of the platform frame against the spring 29.

It will be seen from the foregoing that the sub-frame 21 is a rigid, non-deformable construction and forms a unitary non-deformable support for the spring 29 and for all of the pivotally movable parts of the scale, holding the pivotal axes of said parts in a constant fixed spaced relation with respect to each other, and thus reducing the possibility of inaccuracies in the scale.

The dial 51 may be printed or otherwise placed on the glass crystal 45 encasing the pointer, and a second, rotatably adjustable dial 52 is pivotally mounted upon the inner side of the crystal 45, concentric to the stationary dial 51 by means of the shaft 53 journalled through a suitable aperture in the crystal and having a knob 54 on its outer end for rotatably adjusting the dial 52.

A charging valve 55, of usual and well known construction, is rigidly mounted upon the inner surface of the hinged front wall 16 of the casing, as by the flanges 56 formed integral with the valve and bolts 57 or the like. This charging valve is provided with the usual rotatable knob 59 for manually opening and closing the same.

A flexible hose 60 is provided with a coupling 61 for connection to the threaded inlet nipple 62 of the charging valve and is provided at its other end with a coupling 63 for connection to the outlet of a refrigerant gas bottle or drum as will be later described.

A second flexible hose 64 may be attached to the threaded outlet nipple 65 of the charging valve 55, by means of a coupling 66, and the opposite end of said hose is adapted to be connected to the inlet of the unit of a refrigerator or the like to be serviced.

The platform 67 is preferably adapted to be detachably connected to the platform frame structure 31 by means of the screws 68 connected to and extending upwardly from the flanges 35 of the frame structure 31 and nuts 69 adapted to clamp the detachable platform thereto.

This platform 67 has a frame thereon for supporting a refrigerant gas bottle or drum, indicated generally at 70, said frame comprising an integral upright plate 71. A horizontal angle member 72 welded, or otherwise secured, to the platform 67 and terminates in the angular upwardly disposed arm 73 having a notch 74 in its upper end for seating the outlet neck 75 of the bottle.

A ring 76 is detachably connected to the upper end of the upright plate 71, in substantially horizontal position, and adapted to encircle the bottle or drum 70 to hold the same in vertical position. The platform 67 with its bottle supporting frame is preferably detachable in order that it may be removed from the frame 31 and placed within the case, when not in use, so that the case may be closed as shown in Fig. 1.

Figure 2:
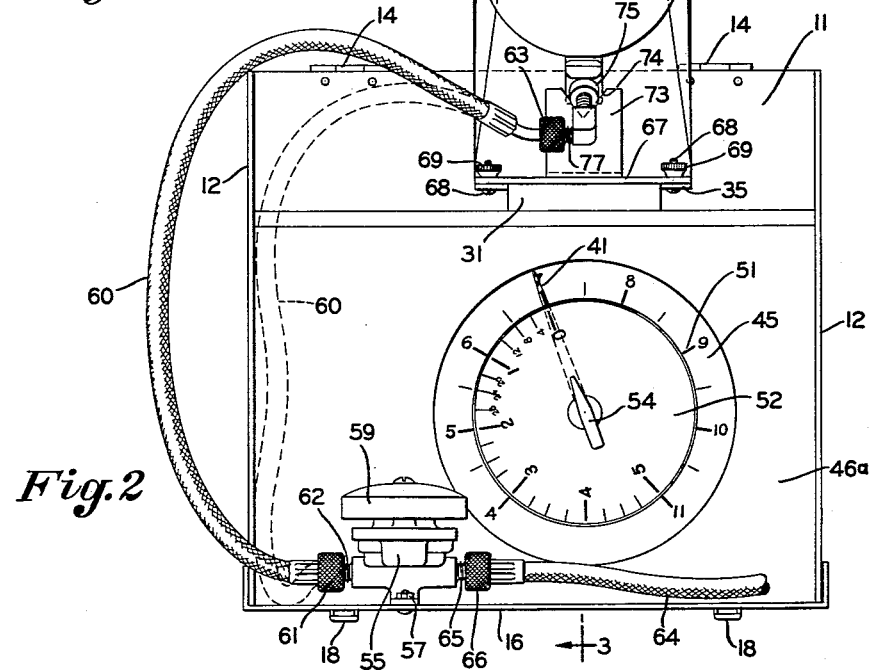
Fig. 2 is a front elevation of the device with the cover and hinged front wall in open position, showing a bottle supported upon the platform of the scale and the parts in operative position for charging fluid from the bottle and weighing the amount of the charge.

In the operation of the improved charging and weighing device the lid or cover 13 is opened and the hinged front wall 16 is swung downward upon the floor or other horizontal support upon which the device is placed for use. The platform 67 is attached to the frame 31 and the bottle or drum 70 mounted thereon, as shown in Figs. 2 and 3, and the coupling 63 of the hose 60 is attached to the threaded outlet nipple 77 of the bottle 70.

The hose 64 is attached to the outlet nipple of the charging valve, by means of the coupling 66, and is connected to the inlet of the unit of the refrigerator in conventional manner. The knob 54 is then operated to turn the rotatable dial 52 to the position shown in Fig. 2 so that the zero marking upon the rotatable dial registers with the pointer 41.

The usual weight of a bottle or drum filled with refrigerant fluid is about 11 pounds and the usual weight of the empty bottle or drum is about 4 pounds. The stationary dial 51 is thus calibrated to show any weight between 4 and 11 pounds.

It will be seen that as fluid is used from the bottle the weight will be reduced and the pointer 41 will thus move toward the left. As shown in Fig. 2 the bottle 70 would be about half full of refrigerant fluid, the total weight of the bottle and fluid therein being 7 pounds, the pointer being located at this point.

The zero marking on the rotatable dial 52 is thus set at this point and as fluid is discharged from the bottle and into the refrigerator unit the pointer 41 will move in a counterclockwise direction indicating upon the dial 52 the number of ounces of fluid which are charged into the refrigerator or the like.

In order to prevent any fluctuation of the pointer during the time the device is in operation, the flexible hose 60 may be supported over the corresponding side wall 12 of the casing, as shown in full lines in Figs. 2 and 3, or may be supported against said side wall 12 and upon the horizontally disposed front wall 16, as shown in dotted lines in said figures. Thus the weight of this hose will cause no fluctuation of the pointer 41.

Furthermore, it will be seen that since the charging valve 55 is rigidly mounted upon the hinged front wall 16, which at this time is supported in horizontal position upon the floor, the rotation of the knob 59 to operate the charging valve will not cause any movement or vibration of the flexible hose 60 and will thus cause no fluctuation of the pointer 41.

With the parts in the positions shown in Figs. 2 and 3 and above described, the valve 78 of the bottle 70 is opened permitting fluid from the bottle to discharge through the hose 60, and the knob 59 of the charging valve is opened permitting the fluid to flow through the charging valve and the hose 64 to the unit being serviced.

The pointer 41 will then move counterclockwise as the weight of the bottle decreases indicating upon the rotatable dial 52 the number of ounces being charged into the unit, and when the desired amount of refrigerant has been charged into the unit, the charging valve is closed.

The hose 64 may then be detached from the charging valve, the hose 60 detached from the bottle, the bottle 70 removed and the platform 67 and bottle frame thereon detached from the frame structure 31 and placed within the casing or box.

The case may then be closed as shown in Fig. 1, the depending flange 15 of the cover 13 being connected to the hinged front wall 16 by the latches 18—19 and the device may be carried by the handle 20.

From the above it will be evident that a simple, efficient device is provided for charging refrigerant fluid and weighing the amount of fluid charged, the various parts being so constructed and assembled that there is no fluctuation of the pointer during operation whereby the amount of fluid being charged may be accurately weighed.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful constructions, and reasonable mechanical equivalents thereof obvious to those skilled in the art, are set forth in the appended claims.

I claim:

1. A fluid charging and weighing device comprising a case, a scale located in the case and including a vertically movable platform, a dial, a pointer cooperating with the dial and operatively connected to the platform, spring means urging the platform into an elevated position, means upon the platform for supporting a refrigerant fluid bottle and the like having an outlet neck in inverted position, a charging valve rigidly mounted within the case, a flexible hose connected to the inlet side of the valve and having means for connection to the outlet neck of the bottle, means for supporting said hose between the valve and the bottle for preventing fluctation of the pointer, and a second flexible hose having means for connection to the outlet side of the valve and to a unit to be serviced.

2. A fluid charging and weighing device comprising a case, a scale located in the case and including a vertically movable platform, a dial, a pointer cooperating with the dial and operatively connected to the platform, spring means urging the platform into an elevated position, means upon the platform for supporting a refrigerant fluid bottle and the like having an outlet neck in inverted position, a charging valve rigidly mounted within the case, a flexible hose connected to the inlet side of the valve and having means for connection to the outlet neck of the bottle, means for supporting said hose between the valve and the bottle for preventing fluctuation of the pointer, means on the case for supporting said hose to prevent fluctuation of the pointer, and a second flexible hose having means for connection to the outlet side of the valve and to a unit to be serviced.

3. A fluid charging and weighing device comprising a case, a scale located in the case and including a vertically movable platform, a dial, a pointer cooperating with the dial and operatively connected to the platform, spring means urging the platform into an elevated position, means upon the platform for supporting a refrigerant fluid bottle and the like having an outlet neck in inverted position, said bottle supporting means comprising a notched bracket for seating the outlet neck of a bottle and an upright bar having a horizontally disposed ring thereon adapted to encircle the bottle, a charging valve rigidly mounted within the case, a flexible hose connected to the inlet side of the valve and having means for connection to the outlet neck of the bottle, means for supporting said hose between the valve and the bottle for preventing fluctuation of the pointer, and a second flexible hose having means for connection to the outlet side of the valve and to a unit to be serviced.

4. A fluid charging and weighing device comprising a case having a bottom wall, a back wall and side walls, a cover hingedly connected to the upper edge of the back wall, and a front wall hingedly connected to the forward edge of the bottom wall, and arranged to be opened into horizontal position in contact with a supporting surface for the case, a scale mounted upon the bottom wall and including a vertically movable platform frame, a dial, a pointer cooperating with the dial and operatively connected to the platform frame, spring means urging the platform frame into an elevated position, a platform, means detachably connecting the platform to the platform scale, means upon the platform for supporting a refrigerant fluid bottle and the like having an outlet neck in inverted position, a charging valve rigidly mounted upon the inner side of the hinged front wall, and arranged to be rigidly supported when said hinged front wall is in open position, a flexible hose connected to the inlet side of the valve and having means for connection to the outlet neck of the bottle, and a second flexible hose having means for connection to the outlet side of the valve and to a unit to be serviced, said case comprising a carrying case for said fluid charging and weighing device when said hinged cover and hinged front wall are located in closed position.

5. A fluid charging and weighing device comprising a case having a bottom wall, a back wall and side walls, a cover hingedly connected to the upper edge of the back wall, and a front wall hingedly connected to the forward edge of the bottom wall and arranged to be opened into horizontal position in contact with a supporting surface for the case, a scale mounted upon the bottom wall and including a vertically movable platform frame, a dial, a pointer cooperating with the dial and operatively connected to the platform frame, spring means urging the platform frame into an elevated position, a platform, means detachably connecting the platform to the platform scale, means upon the platform for supporting a refrigerant fluid bottle and the like having an outlet neck in inverted position, a charging valve rigidly mounted upon the inner side of the hinged front wall and arranged to be rigidly supported when said hinged front wall is in open position, a flexible hose connected to the inlet side of the valve and having means for connection to the outlet neck of the bottle, means on the case for supporting said hose to prevent fluctuation of the pointer, and a second flexible hose having means for connection to the outlet side of the valve and to a unit to be serviced, said case comprising a carrying case for said fluid charging and weighing device when said hinged cover and hinged front wall are located in closed position.

6. A fluid charging and weighing device comprising a case, a scale located in the case and including a vertically movable platform, a dial, a pointer cooperating with the dial and operatively connected to the platform, a second dial rotatably mounted relative to the first-named dial, spring means urging the platform into an elevated position, means upon the platform for supporting a refrigerant fluid bottle and the like having an outlet neck in inverted position, the pointer being adapted to indicate on the first-named dial the total weight of the bottle and fluid therein and to indicate on the rotatably mounted dial the weight of the fluid discharged from the bottle, a charging valve rigidly mounted within the case, a flexible hose connected to the inlet side of the valve and having means for connection to the outlet neck of the bottle, means for supporting said hose between the valve and the bottle for preventing fluctuation of the pointer and a second flexible hose having means for connection to the outlet side of the valve and to a unit to be serviced.

7. A fluid charging and weighing device comprising a case having a bottom wall, a back wall and side walls, a cover hingedly connected to the upper edge of the back wall, and a front wall hingedly connected to the forward edge of the bottom wall and arranged to be opened into horizontal position in contact with a supporting surface for the case, a scale mounted upon the bottom wall and including a vertically movable platform frame, a dial, a pointer cooperating with the dial and operatively connected to the platform frame, a second dial rotatably mounted relative to the first-named dial, spring means urging the platform frame into an elevated position, a platform, means detachably connecting the platform to the platform scale, means upon the platform for supporting a refrigerant fluid bottle and the like having an outlet neck in inverted position, the pointer being adapted to indicate on the first-named dial the total weight of the bottle and fluid therein and to indicate on the rotatably mounted dial the weight of the fluid discharged from the bottle, a charging valve rigidly mounted upon the inner side of the hinged front wall and arranged to be rigidly supported when said hinged front wall is in open position, a flexible hose connected to the inlet side of the valve and having means for connection to the outlet neck of the bottle, and a second flexible hose having means for connection to the outlet side of the valve and to a unit to be serviced, said case comprising a carrying case for said fluid charging and weighing device when said hinged cover and hinged front wall are located in closed position.

8. A fluid charging and weighing device comprising a case, a scale located in the case and including a sub-frame mounted in the case, a platform supporting frame vertically movably mounted upon the sub-frame, spring means urging the platform supporting frame into an elevated position, a scale platform detachably mounted upon the platform supporting frame, means upon the platform for supporting a refrigerant fluid bottle and the like having an outlet neck in inverted position, a dial in the case, a pointer cooperating with the dial and operatively connected to the platform supporting frame, a charging valve rigidly mounted within the case, a flexible hose connected to the inlet side of the valve and having means for connection to the outlet neck of the bottle, means on the case for supporting said hose between the valve and the bottle to prevent fluctuation of the pointer, and a second flexible hose having means for connection to the outlet side of the valve and to a unit to be serviced.

9. A fluid charging and weighing device comprising a case, a scale located in the case and including a sub-frame mounted in the case, a platform supporting frame vertically movably mounted upon the sub-frame, spring means urging the platform supporting frame into an elevated position, a scale platform detachably mounted upon the platform supporting frame, means upon the platform for supporting a refrigerant fluid bottle and the like having an outlet neck in inverted position, a dial in the case, a pointer cooperating with the dial and operatively connected to the platform supporting frame, a second dial rotatably mounted relative to the first-named dial, the pointer being adapted to indicate on the first-named dial the total weight of the bottle and fluid therein and to indicate on the rotatably mounted dial the weight of the fluid discharged from the bottle, a charging valve rigidly mounted within the case, a flexible hose connected to the inlet side of the valve and having means for connection to the outlet neck of the bottle, means for supporting said hose between the valve and the bottle for preventing fluctuation of the pointer, means on the case for supporting said hose to prevent fluctuation of the pointer, and a second flexible hose having means for connection to the outlet side of the valve and to a unit to be serviced.

10. A fluid charging and weighing device comprising a case, a scale located in the case and including a vertically movable platform, a dial, a pointer cooperating with the dial and operatively connected to the platform, spring means urging the platform into an elevated position, a frame detachably connected to the platform comprising an upright plate, a ring detachably connected to the upper end of the upright plate and an upwardly disposed arm having a notch in its upper end and seating the outlet neck of a refrigerant fluid bottle in inverted position, a charging valve rigidly mounted within the case, a flexible hose connected to the inlet side of the valve and having means for connection to the outlet neck of the bottle, and a second flexible hose having means for connection to the outlet side of the valve and to a unit to be serviced.

References Cited in the file of this patent

UNITED STATES PATENTS

| | | |
|---|---|---|
| 1,897,162 | Endacott | Feb. 14, 1933 |
| 2,075,408 | Sholes | Mar. 30, 1939 |
| 2,544,734 | St. Clair | Mar. 13, 1951 |
| 2,598,532 | Gibbon | May 27, 1952 |

FOREIGN PATENTS

| | | |
|---|---|---|
| 258,709 | Great Britain | Sept. 30, 1926 |